United States Patent
Tanase et al.

(10) Patent No.: US 10,382,656 B2
(45) Date of Patent: Aug. 13, 2019

(54) IMAGE PROCESSING DEVICE AND PRINTING SYSTEM (71) Applicant: SEIKO EPSON CORPORATION, Tokyo (JP)

(72) Inventors: Kazuyoshi Tanase, Nagano (JP); Shun Sakaibara, Nagano (JP); Mitsuhisa Ando, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/004,497

(22) Filed: Jun. 11, 2018

(65) Prior Publication Data
US 2018/0359391 A1 Dec. 13, 2018

(30) Foreign Application Priority Data
Jun. 12, 2017 (JP) .................. 2017-114950

(51) Int. Cl.
H04N 1/62 (2006.01)
H04N 1/00 (2006.01)
H04N 1/40 (2006.01)

(52) U.S. Cl.
CPC ........... H04N 1/62 (2013.01); H04N 1/00411 (2013.01); H04N 1/40068 (2013.01)

(58) Field of Classification Search
CPC ... H04N 1/62; H04N 1/00411; H04N 1/40068
USPC ........................................................ 358/1.2
See application file for complete search history.

(56) References Cited

U.S. PATENT DOCUMENTS

| 6,411,400 | B1* | 6/2002 | Mori ................... G06K 15/00 358/1.2 |
| 2006/0146082 | A1* | 7/2006 | Nunokawa ............. B41J 2/2103 347/15 |
| 2007/0229563 | A1* | 10/2007 | Shimakawa ......... G06K 15/107 347/14 |
| 2011/0286669 | A1* | 11/2011 | Hagisawa .......... G06K 9/00449 382/182 |

FOREIGN PATENT DOCUMENTS

JP 07-131635 A 5/1995
JP 09-284584 A 10/1997

* cited by examiner

Primary Examiner — Allen H Nguyen (57) ABSTRACT

An image processing device including a user interface, an image data inputting section that inputs image data, a resolution converting section that converts the image data to resolution corresponding to a printing device, a color converting section that generates ink amount data, and a print data generating section that generates print data based on the ink amount data, in which the resolution converting section includes a color inputting section that inputs the spot color and the specific condition for performing a spot color replacement of replacing the spot color in the specific condition by the color converting section through the user interface, and a thinning processing section that performs a simple thinning process on a spot color region including the spot color in a case in which a thinning process of converting the resolution of the image data to a second resolution lower than the first resolution is performed.

12 Claims, 8 Drawing Sheets

SPOT COLOR LIST

| SPOT COLOR No. | R, G, B | C, M, Y, K | Or, Gr, CL | SPOT COLOR NAME |
|---|---|---|---|---|
| 1 | 100, 120, 80 | 0, 255, 0, 0 | 0, 0, 10 | X1 |
| . . . . | . . . . | . . . . | . . . . | . . . . |

A

F — NEWLY CREATE
G — DELETE

SPOT COLOR EDIT

SPOT COLOR No.  [ 1 ]   — C
RANGE: 1 TO 255

SPOT COLOR NAME: [ X1 ] — B

RGB COLOR — D

☒ R [ 100 ]
☒ G [ 120 ]
☒ B [ 80 ]
RANGE: 0 TO 255

— E

☒ C [ 0 ]     ☒ K [ 0 ]
☒ M [ 255 ]   ☒ Or [ 0 ]
☒ Y [ 0 ]     ☒ Gr [ 0 ]
              ☒ CL [ 10 ]
RANGE: 0 TO 255

H — APPLY

IMAGE PROCESSING DEVICE AND PRINTING SYSTEM

BACKGROUND

1. Technical Field

The present invention relates to an image processing device and a printing system including the image processing device.

2. Related Art

In the related art, a color image forming apparatus (printing system) having a technique of color designation for replacing a predetermined color in a predetermined input image with a specific color is known (JP-A-9-284584).

For example, in a printing system disclosed in JP-A-9-284584, color designation (color adjustment) in which a predetermined color (three-color gray expressed by red (R), green (G), and blue (B)) in a predetermined input image is replaced with a specific color (gray expressed by black plate K (black)) is possible. When an image forming process (printing) is performed after color adjustment, a color can be expressed by the black plate K, and thus it is possible to form an achromatic gray which is a colorless. Further, in a case in which a background is formed by solid coating with the three-color gray and unevenness is conspicuous in the solid coating with the three-color gray, when a color is expressed by replacing the three-color gray with the black plate K, the unevenness is suppressed.

However, in a case in which output resolution (printing resolution) is lower than input resolution (resolution of input image) and a thinning process for thinning data of the input image is performed, there is a case in which color information before the thinning process is not reflected, deviation is caused from a designated color, and an image quality is deteriorated, and thus there is still room for improvement.

SUMMARY

The invention can be realized in the following aspects or application examples.

Application Example 1

According to this application example, there is provided an image processing device which generates print data for a printing device by performing an image process on image data, the device including a user interface that is used for a user to set contents of the image process, an image data inputting section that inputs the image data, a resolution converting section that converts the image data to resolution corresponding to the printing device, a color converting section that generates ink amount data based on the image data converted by the resolution converting section, and a print data generating section that generates the print data based on the ink amount data, in which the resolution converting section includes a color inputting section that inputs a first color and a second color through the user interface in order to perform a spot color replacement in which the first color is replaced with the second color by the color converting section, and a thinning processing section that performs a simple thinning process on a predetermined region including the first color in a case in which a thinning process of converting the resolution of the image data from a first resolution to a second resolution lower than the first resolution is performed.

The image processing device generates print data for the printing device based on the image data (hereinafter, refer to as input image data) acquired by the image data inputting section. In a case in which resolution (first resolution) of the input image data is higher than resolution (second resolution) of the print data, the thinning processing section of the resolution converting section converts the input image data of the first resolution to image data (hereinafter, refer to as output image data) of the second resolution, and outputs the converted data to the color converting section. The color converting section performs a spot color replacement of replacing the first color on a predetermined region with the second color based on a condition in which the first color input by the color inputting section of the resolution converting section is replaced with the second color.

For example, in a case in which the input image data is a raster format and is constituted by four rasters of a first raster, a second raster, a third raster, and a fourth raster, and the output image data is constituted by two rasters, the thinning processing section performs a thinning process of thinning the input image data constituted by four rasters to be the output image data constituted by two rasters.

The simple thinning process performed by the thinning processing section is a process of thinning the input image data constituted by the four rasters of the first raster, the second raster, the third raster, and the fourth raster to be output image data constituted by the first raster and the third raster, or a process of thinning the input image data to be output image data constituted by the second raster and the fourth raster. Since the input image data is reflected to the output image data created by the simple thinning process, there is no replacement with data different from the input image data.

Since the first color is not replaced with data of a color different from the first color on a predetermined region on which the simple thinning process is performed, the first color is replaced with the second color by the color converting section on the predetermined region on which the simple thinning process is performed. That is, the color converting section is capable of appropriately performing the spot color replacement in which the first color is replaced with the second color on the predetermined region on which the simple thinning process is performed, and thus a defect that deviation from a designated color (target color) occurs so as to deteriorate an image quality is not easily generated.

An average thinning process performed by the thinning processing section is a process of thinning the input image data constituted by the first raster, the second raster, the third raster, and the fourth raster to be the output image data constituted by a new raster obtained by averaging the first raster and the second raster and a new raster obtained by averaging the third raster and the fourth raster.

In a case in which the new raster is the same as the raster of the input image data, the output image data created by the average thinning process is not replaced with data different from the input image data. In this case, the color converting section is capable of appropriately performing the spot color replacement in which the first color is replaced with the second color on a predetermined region on which the average thinning process is performed in the same manner as the predetermined region on which the simple thinning process is performed.

Meanwhile, in a case in which the new raster is different from the raster of the input image data, the output image data created by the average thinning process is replaced with data different from the input image data. That is, the first color of the predetermined region is replaced with data of a color different from the first color by the average thinning process. In this case, the color converting section is not capable of appropriately performing the spot color replacement in which the first color is replaced with the second color on the predetermined region on which the average thinning process is performed, and thus a defect that deviation from a target color occurs so as to deteriorate an image quality is easily generated.

Therefore, with respect to the predetermined region on which the spot color replacement is performed, the simple thinning process which makes an image quality not to be easily deteriorated is preferable rather than the average thinning process which makes an image quality to be easily deteriorated. That is, the thinning processing section preferably performs the simple thinning process on the predetermined region.

Application Example 2

In the image processing device according to the application example described above, it is preferable that the thinning processing section perform an average thinning process on a region other than the predetermined region.

In a case in which the input image data constituted by the first raster, the second raster, the third raster, and the fourth raster is thinned to be the output image data constituted by the first raster and the third raster by the simple thinning process, and the second raster is a ruled line pattern (ruled line), information relating to the ruled line (second raster) is not included in the output image data on which the simple thinning process is performed. In a case in which the input image data constituted by the first raster, the second raster, the third raster, and the fourth raster is thinned to be the output image data constituted by the second raster and the fourth raster by the simple thinning process, and the second raster is the ruled line pattern (ruled line), information relating to the ruled line (second raster) is included in the output image data on which the simple thinning process is performed.

As seen from the above, the information relating to the ruled line (second raster) is not included in the output image data on which the simple thinning process is performed, and there is a concern that the ruled line is lost.

In a case in which the input image data constituted by the first raster, the second raster, the third raster, and the fourth raster is thinned to be the output image data constituted by the new raster obtained by averaging the first raster and the second raster and the new raster obtained by averaging the third raster and the fourth raster by the average thinning process, and the second raster is the ruled line pattern (ruled line), the information (ruled line) relating to the second raster is reflected to the new raster obtained by averaging the first raster and the second raster, and thus the information relating to the ruled line (second raster) is included in the output image data on which the average thinning process is performed.

Further, in a case in which the spot color replacement is not necessary, the color converting section is capable of appropriately performing the color converting process on the output image data on which the average thinning process is performed in a condition set as a default, and thus a defect that an image quality is deteriorated on a region other than the predetermined region where the spot color replacement is not necessary is not easily generated.

Therefore, with respect to the region other than the predetermined region where the spot color replacement is not necessary, the average thinning process which does not occur a concern that the ruled line is lost is preferable rather than the simple thinning process which occurs a concern that the ruled line is lost. That is, it is preferable that the thinning processing section perform the average thinning process on the region other than the predetermined region.

Application Example 3

In the image processing device according to the application example described above, it is preferable that the predetermined region be set through the user interface.

The spot color replacement in which the first color is replaced with the second color is applied to, for example, a predetermined region (for example, a region where a logo mark of a company is disposed) so as to be the corporate color, and the predetermined region on which the spot color replacement is performed is easily conspicuous. However, in a case in which general versatility of the first color is high, and the first color is included in a region other than the predetermined region, the spot color replacement is also performed on the region other than the predetermined region. Therefore, there is a case in which it is difficult to make the predetermined region on which the spot color replacement is performed to be easily conspicuous.

When the predetermined region (the region where the spot color replacement is performed) is set through the user interface, the spot color replacement can be performed on only the predetermined region without performing the spot color replacement on the region other than the predetermined region. Therefore, even in a case in which general versatility of the first color is high, the predetermined region on which the spot color replacement is performed can be easily conspicuous.

Application Example 4

In the image processing device according to the application example described above, it is preferable that the first color and the second color be set based on a preset in which a corresponding relationship between the first color and the second color is defined in advance through the user interface.

When the preset in which the corresponding relationship between the first color and the second color is defined in advance can be set through the user interface, a condition of the spot color replacement with respect to various colors can be set, and the spot color replacement can be appropriately performed on the various colors.

Application Example 5

In the image processing device according to the application example described above, it is preferable that the first color be represented by a color specification value corresponding to a color space indicating the image data, and the second color be represented by a color specification value corresponding to a color space indicating the print data.

When the first color represented by the color specification value corresponding to the color space indicating the image data is replaced with the second color represented by the color specification value corresponding to the color space indicating the print data so as to create the print data, it is possible to obtain a printed material on which the target color (second color) is printed using the print data.

Application Example 6

In the image processing device according to the application example described above, it is preferable that an informing section that informs a user in a case in which a ruled line is included in the predetermined region be further included.

In a case in which the simple thinning process is performed on the predetermined region when the informing section that informs the user is further included in a case in which the ruled line is included in the predetermined region, it is possible to inform the user of a concern that the ruled line is lost on the predetermined region.

For example, in a case in which the ruled line on the predetermined region is an important element, and the ruled line is not lost from the predetermined region, because of informing from the informing section, the simple thinning process is stopped to be performed on the predetermined region and is replaced with another thinning process (for example, average thinning process), and it is possible to prevent the ruled line from being lost from the predetermined region.

Application Example 7

According to this application example, there is provided a printing system including the image processing device disclosed in the application examples described above, and the printing device.

The image processing device disclosed in the application examples described above performs the simple thinning process which makes an image quality to be easily deteriorated on the predetermined region and the average thinning process which makes the ruled line not to be lost on the region other than the predetermined region, and thereby making it possible to create the print data for high quality printing. Therefore, the printing system including the image processing device disclosed in the application examples described above and the printing device are capable of performing high quality printing.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, with reference to drawings, an embodiment of the invention will be described. The embodiment illustrates an aspect of the invention, but does not limit the invention, and the embodiment can be randomly modified within a range of a technical idea of the invention. In addition, in each drawing to be described later, in order to make each layer or each part to be recognizable size on the drawing, a scale of each layer or part is made to be different from a scale in actual.

Embodiment

Outline of Printing System

Figure 1:
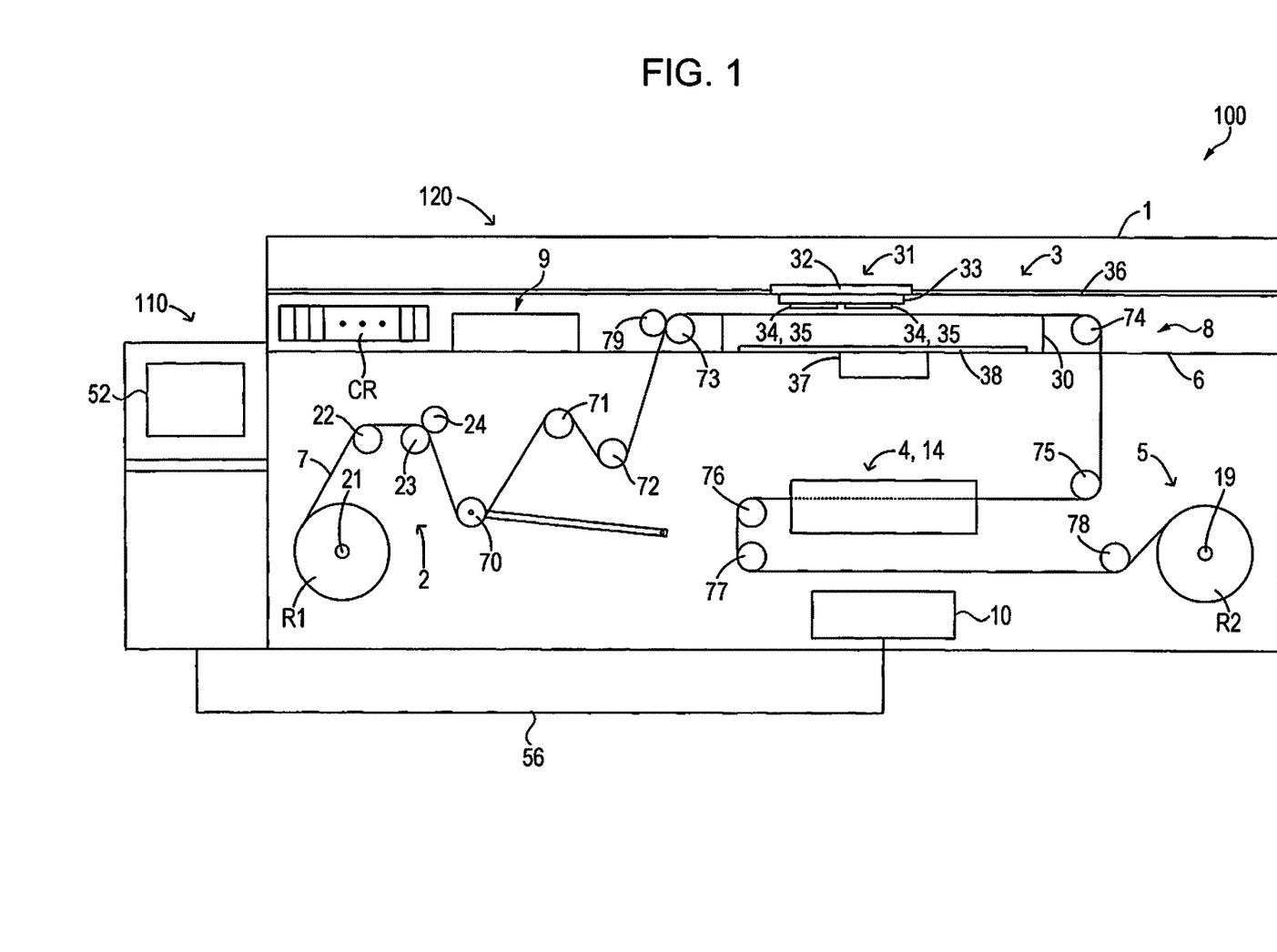
FIG. 1 is a schematic view illustrating an outline of a printing system according to an embodiment.
Figure 2:
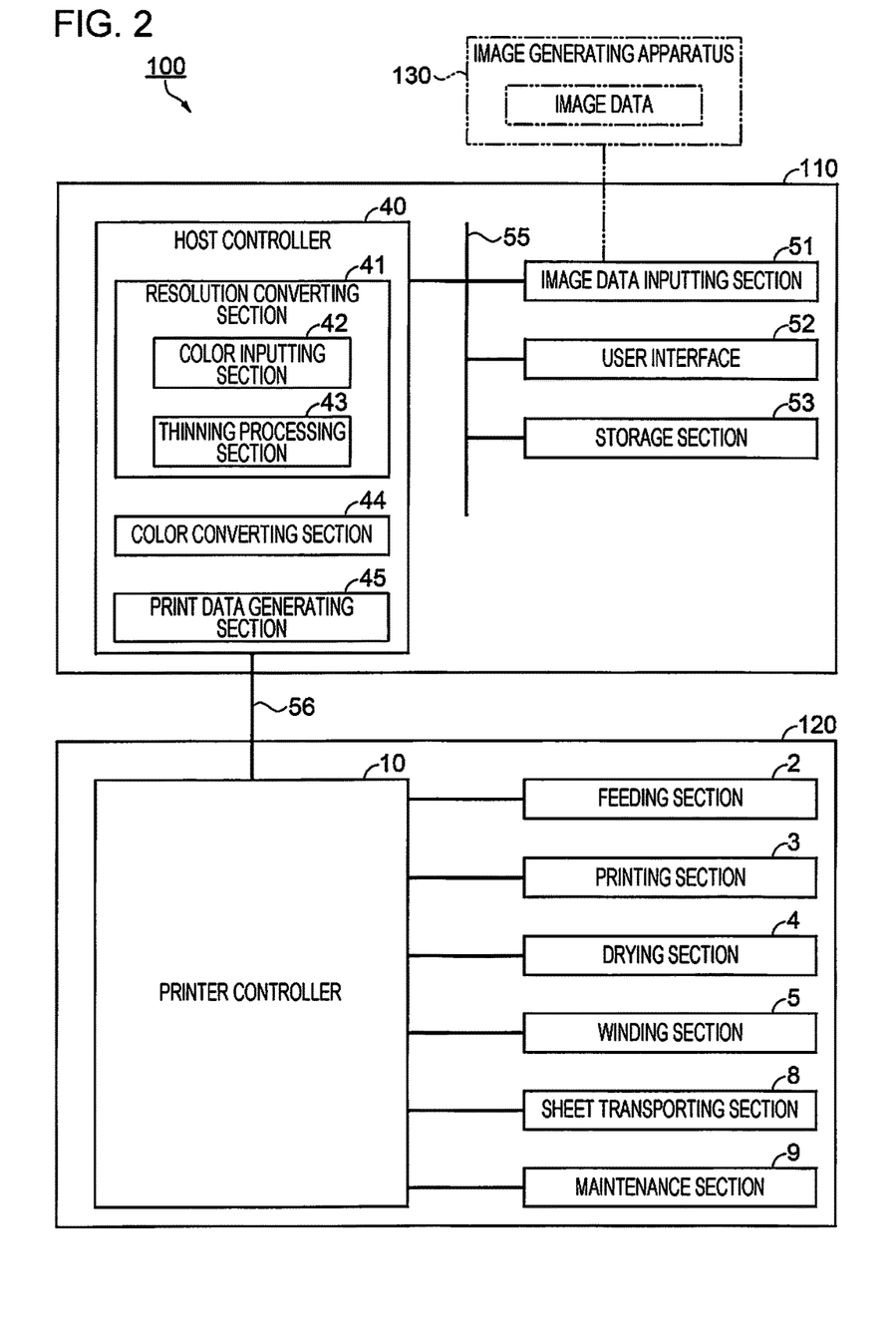
FIG. 2 is a block diagram of the printing system according to the embodiment.

FIG. 1 is a schematic view illustrating an outline of a printing system according to an embodiment. FIG. 2 is a block diagram of the printing system according to the embodiment.

First, with reference to FIGS. 1 and 2, an outline of a printing system 100 according to the embodiment will be described.

As illustrated in FIG. 1, the printing system 100 according to the embodiment includes an image processing device 110 that generates print data for a printing device 120 by performing an image process on image data transferred from an image generating device 130 (refer to FIG. 2) such as a personal computer, and the printing device 120 that prints an image on a medium 7 based on print data created by the image processing device 110.

The printing device 120 prints an image on the medium 7 in an ink jet method by feeding a long medium 7 wound around in a roll shape and includes a main body case 1 in a substantially rectangular parallelepiped shape.

Inside the main body case 1, a printer controller 10 that controls each section of the printing device 120, a feeding section 2 that feeds the medium 7 from a roll body R1 wound in a roll shape, a printing section 3 that performs printing by discharging ink to the medium 7 fed from the feeding section 2, a drying section 4 that dries the medium 7 to which ink is attached, a winding section 5 around which the dried medium 7 is wound as a roll body R2, an ink cartridge CR, and a maintenance section 9.

An inside of the main body case 1 is divided into an upper side and a lower side by a flat plate shape base 6 disposed along a horizontal plane. The ink cartridge CR, the maintenance section 9, the printing section 3, and the like are disposed on an upper side of the base 6. The feeding section 2, the drying section 4, and the winding section 5 are disposed on a lower side of the base 6.

The feeding section 2 is disposed to be inclined to the left on a lower side of a platen 30 and includes a rotatable holding shaft 21 holding the roll body R1 around which the medium 7 is wound in a roll shape. Further, the feeding section 2 includes a roller 22 and a feeding roller 23 which are positioned on an upper side of the holding shaft 21.

The medium 7 unwound from the roll body R1 is stretched to the roller 22 and the feeding roller 23 in this order. The feeding roller 23 is a driving roller which is rotated by receiving a driving force from a motor (illustration thereof is omitted). Also, the feeding roller 23 has a function of feeding the medium 7 by being rotated in a state in which the medium 7 taken out from the holding shaft 21 is wound and hooked. In addition, a pressing roller 24 urged toward the feeding roller 23 is provided so that by the feeding roller 23 is capable of reliably feeding the medium 7.

Meanwhile, the winding section 5 is disposed to be inclined to a right side on a lower side of the platen 30 and includes a rotatable winding shaft 19. The winding shaft 19 supports the roll body R2 around which the medium 7 is wound.

The drying section 4 is disposed right under the platen 30 between the feeding section 2 and the winding section 5. The medium 7 fed from the feeding section 2 sequentially passes through the printing section 3 and the drying section 4 while being guided by the sheet transporting section 8 constituted by ten rollers 70 to 79, and is wound around the winding section 5. Also, a printing process is performed on the medium 7 by the printing section 3 or a drying process is performed on the medium 7 by the drying section 4.

The ink cartridge CR stores seven types of inks including a cyan (C) ink, a magenta (M) ink, a yellow (Y) ink, a black (K) ink, an orange (Or) ink, a green (Gr) ink, and a clear (CL) ink. Moreover, the number of inks stored in the ink cartridge CR is not limited to the seven types, and may be less than seven types, or may be more than seven types.

The printing section 3 includes a platen 30, a recording unit 31, and the like. The platen 30 is fixed to an upper surface of the base 6 and is a rectangular shape, and the medium 7 is supported from a lower side thereof by an upper surface parallel to a horizontal surface of the platen. The recording unit 31 includes a carriage 32, a flat shaped supporting plate 33 attached to a lower surface of the carriage 32, and a plurality of recording heads 34 attached to a lower surface of the supporting plate 33. The printing process in the printing section 3 is performed by the recording unit 31 disposed on an upper side of the platen 30. In the recording unit 31, an image is printed on the medium 7 by discharging ink, which is supplied by an ink supply mechanism (illustration thereof is omitted) from the ink cartridge CR disposed on a left side of the platen 30, from a nozzle 35 of the recording head 34.

The carriage 32 is integrally movable with the supporting plate 33 and the recording head 34. Specifically, in the printing section 3, a first guide rail 36 extending in one direction (main scanning direction) is provided, and the carriage 32 moves along the first guide rail 36. Further, in the printing section 3, a second guide rail (illustration thereof is omitted) extending in a direction (sub canning direction) intersecting with the main scanning direction is provided, and the carriage moves along the second guide rail in the sub canning direction.

Also, the carriage 32 of the recording unit 31 is moved two-dimensionally with respect to the medium 7 stopped on an upper surface of the platen 30, and printing in which an image is printed on the medium 7 is performed.

Specifically, the recording unit 31 alternately repeats an operation (main scanning) in which the carriage 32 is moved in the main scanning direction and ink is discharged to the medium 7 from the nozzle 35 of the recording head 34 and an operation (sub scanning) in which the carriage 32 (recording head 34) is moved in the sub canning direction intersecting with the main scanning direction, performs printing one time (one frame) by performing M main scanning in accordance with printing resolution, and thus one frame image is formed on the medium 7.

In other words, the ink from the nozzle 35 of the recording head 34 is discharged as ink droplets, the ink droplets are landed onto a target position of the medium 7, and dots are formed on the target position. Dot rows in which the dots formed on the target position are arranged in the main scanning direction are formed by the main scanning in which the carriage is moved in the main scanning direction and the ink from the nozzle 35 of the recording head 34 is discharged onto the medium 7. Further, the main scanning and the sub scanning are alternately repeated, the dot rows arranged in the main scanning direction are juxtaposed with each other in the sub canning direction, and the one frame image is formed on the medium 7.

In description hereinafter, the one frame image may be referred to as a deliverable.

When one frame image is formed on a printing surface of the medium 7 stopped on the upper surface of the platen 30, the medium 7 is intermittently transported in transporting direction, and a non-printed surface of the medium 7 is disposed on the upper surface of the platen 30. Subsequently, new one frame is printed on a non-printed surface of the medium 7, and one frame image is formed on the non-printed surface of the medium 7. When the one frame image is formed the non-printed surface of the medium 7, the medium 7 is intermittently transported in the transporting direction again, and the non-printed surface of the medium 7 is disposed on the upper surface of the platen 30. Also, a series of such operations is repeatedly performed, and the one frame images are repeatedly formed on the medium 7.

As described above, the printing device 120 repeats an operation of printing one frame on the medium 7 and an operation of intermittently transporting the medium 7 after the one frame is printed, and thus the one frame images (deliverables) are repeatedly formed on the medium 7.

A plurality of suction holes (illustration thereof is omitted) are opened on the upper surface of the platen 30, and a suction section 37 is attached to a lower surface of the platen 30. Also, when the suction section 37 is operated, load occurs in the suction hole of the upper surface of the platen 30, and the medium 7 is sucked to the upper surface of the platen 30. Also, the suction section 37 holds the medium 7 flatly by sucking the medium 7 while the medium 7 is stopped on the platen 30 for printing, and when one frame is finished to be printed, sucking the medium 7 is stopped, and the medium 7 can be smoothly transported.

A heater 38 is attached to a lower surface of the platen 30. The platen 30 is heated to approximately 35° C. to 45° C. by the heater 38. The medium 7 on which ink is discharged from the recording head 34 is primarily dried by heat of the platen 30. Due to the primary drying, the ink landed onto the medium 7 is primarily dried, and thus a defect in which, for example, the ink landed onto a target position of the medium 7 is spread or interference with ink landed onto a next target position occurs, is suppressed.

As described above, on the upper surface of the platen 30, the medium 7 on which one frame is printed and which is primarily dried is moved by being intermittently transported, and is transported into the drying section 4. Also, a drying process is performed in which the medium 7 on which one frame is printed is stayed in the drying section 4 while a new one frame is printed on the non-printed surface of the medium 7 in the printing section 3, air heated by a warm air blowing mechanism 14 is supplied, and the ink landed onto a printing surface of the medium 7 is completely dried.

Also, the medium 7 on which the drying process is performed in the drying section 4 is moved by being intermittently transported, reaches the winding section 5, and is wound up by the winding section 5 as the roll body R2.

As illustrated in FIG. 2, the image processing device 110 includes a host controller 40, an image data inputting section 51 which inputs image data, a user interface 52 used by a user for setting contents of the image process, and a storage section 53. The host controller 40, the image data inputting section 51, the user interface 52, and the storage section 53 are connected to each other through a bus 55.

Further, the host controller 40 is connected to the printer controller 10 through a bus 56.

The image data inputting section 51 is an interface, such as a local area network (LAN) interface or a Universal Serial Bus (USB) interface, which is capable of connecting an external electronic equipment. The image data inputting section 51 receives image data for printing generated by the image generating device 130 constituted by an information processing device such as a personal computer and transfers the image data to resolution converting section 41.

The user interface 52 is constituted by, for example, a liquid crystal display device including a touch panel. The user interface 52 displays the image data received from the image generating device 130, an image printed by the printing device 120, information relating to a printing job, and the like.

The storage section 53 includes a ROM which stores predetermined information to be readable, a RAM which stores various information items to be writable/readable, and the like. In the storage section 53, various computer programs or various information items required for printing control are stored.

The host controller 40 includes the resolution converting section 41 which converts resolution to resolution corresponding to the printing device 120, a color converting section 44 which generates data relating to an ink amount based on the image data converted by the resolution converting section, a print data generating section 45 which generates print data based on the ink amount data, and the like, as functional parts respectively realized when the image processing device 110 or a CPU of the printing device 120 read software (program) from the ROM or RAM. Further, the resolution converting section 41 includes a color inputting section 42 and a thinning processing section 43.

In a case in which the resolution of the image data received from the image generating device 130 is high, and resolution (printing resolution) of the print data generated by the print data generating section 45 is low, the thinning processing section 43 of the resolution converting section 41 performs a thinning process of thinning the image data received from the image generating device 130 so that resolution of the image data becomes resolution the same as the printing resolution.

A preset for performing a spot color replacement is registered in the color inputting section 42 of the resolution converting section 41.

Moreover, the resolution of the image data received from the image generating device 130 is an example of "first resolution", and the resolution of the image data on which the thinning process is performed by the resolution converting section 41 is an example of "second resolution" and is the same as the resolution (printing resolution) of the print data.

In description hereinafter, in the image data received from the image generating device 130 (image data 90 illustrated in FIG. 4), resolution of the main scanning direction is 720 dpi, and resolution of the sub canning direction 720 dpi. The resolution of the print data in the main scanning direction is 720 dpi, and the resolution of the print data in the sub scanning direction is 360 dpi. In addition, the resolution of the image data received from the image generating device 130 may be referred to as 720×720 dpi, and the resolution (resolution of print data) of the image data on which the thinning process is performed by the resolution converting section 41 may be referred to as 720×360 dpi.

The thinning processing section 43 performs the thinning process of thinning the image data received from the image generating device 130 so that the resolution (720×720 dpi) of the image data received from the image generating device 130 becomes the resolution (720×360 dpi) in which the resolution of the image data is the same as the printing resolution.

The image data received from the image generating device 130 is RGB data constituted by color components of red (R), green (Gr), and blue (B). The image data of which resolution is converted by the resolution converting section 41 is also RGB data constituted by three color components of RGB. That is, a color space indicating the image data is an RGB color space. The image data received from the image generating device 130 and the image data of which the resolution is converted are represented by coordinate values (RGB values) in the RGB color space.

Moreover, the image data received from the image generating device 130 and the image data of which the resolution is converted by the resolution converting section 41 may be CYMK data constituted by color components of cyan (C), magenta (M), yellow (Y), and black (K). That is, the color space indicating the image data may be the CYMK color space.

The color converting section 44 performs a color converting process of converting the RGB data of which the resolution is converted by the resolution converting section 41 to data of a CMYK color space. That is, the color converting section 44 generates the image data of the CMYK color space based on the RGB data.

The image data of the CMYK color space after the color converting process is data corresponding to a color of ink included in the printing device 120, and is ink amount data corresponding to each of seven types of inks in the printing system 100. The color converting process is performed based on a table (color conversion lookup table) in which gradation values of the RGB data correspond to gradation values of the CMYK color system data. Moreover, the ink amount data after the color converting process is, for example, CMYK color system data of 256 gradations indicated by the CMYK color space.

The print data generating section 45 performs a halftone process in which the ink amount data (CMYK color system data of 256 gradations) received from the color converting section 44 is converted to data of the number of gradations which can be formed by the printing device 120. Because of the halftone process, data indicating 256 gradations is converted to, for example, 1-bit data indicating two gradations (with or without dots), or 2-bit data indicating four gradations (without dots, with small dots, middle dots, and large dots). Specifically, a generation rate (for example, in a case of four gradations, a generation rate of each case of being without dots, with small dots, middle dots, and large dots) of a dot corresponding to the gradation value is obtained from a dot generation rate table in which the gradation values (0 to 255) correspond to dot generation rates, and pixel data is created based on the obtained generation rate so that dots are formed to be dispersed using a dither method, an error diffusion method, or the like.

Further, the print data generating section 45 performs a rasterizing process in which the pixel data items created by the halftone process are arranged in an order of data to be transferred to the printing device 120, and print data is created. The print data includes raster data indicating a forming state of each dot at the time of main scanning and data indicating a sub scanning feeding amount (a distance at which the carriage 32 is moved in the sub canning direction).

Further, the printer controller 10 reads the print data from the host controller 40, controls the feeding section 2, the printing section 3, the drying section 4, the winding section 5, and the sheet transporting section 8, repeats an operation of printing one frame on the medium 7 and an operation of intermittently transporting the medium 7, and repeatedly forms deliverables on the medium 7.

Outline of Spot Color Replacement

Figure 3:
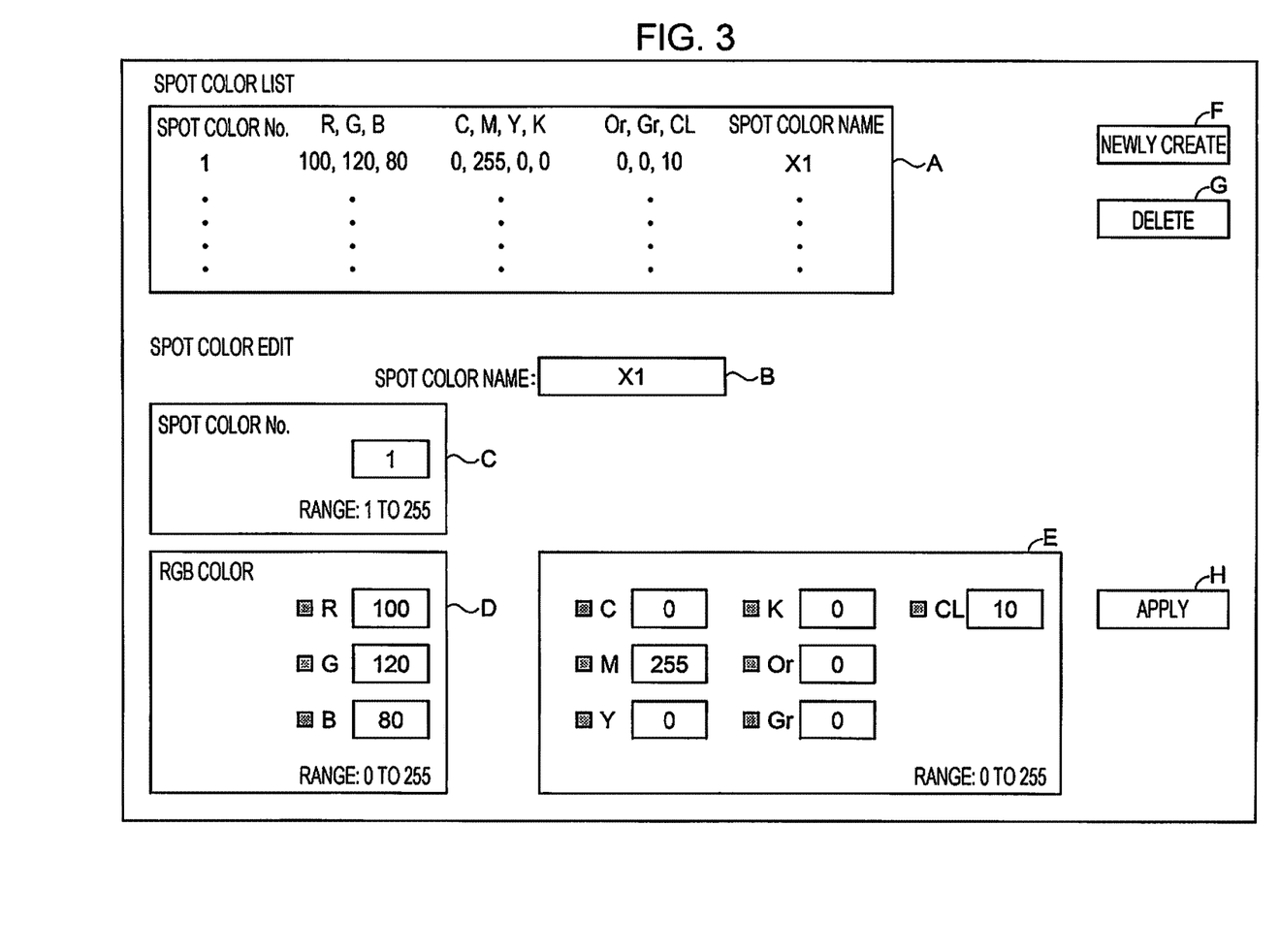
FIG. 3 is a schematic view illustrating a state of a registration screen where an RGB value and a specific condition of a spot color are registered.

FIG. 3 is a schematic view illustrating a state of a screen (hereinafter, refer to as registration screen) used for registering RGB values of spot colors and ink amount data (hereinafter, refer to as specific condition) for realizing the spot color, and the screen is displayed on the user interface 52. In FIG. 3, a state of the registration screen in which required information is input is illustrated.

Next, with reference to FIG. 3, an outline of the spot color replacement will be described.

For example, a color (corporate color) of a company name is an important color which symbolizes the company, and it is necessary to perform color-matching for strictly realizing (printing) the corporate color. For example, a color of a logo mark (symbol mark) of a product is also an important color for symbolizing the product, and it is necessary to perform the same color-matching as that of the color of the company. As seen from the above, as a color of a deliverable formed on the medium 7, a color (hereinafter, refer to as spot color) that a user has attention like the corporate color or a color of a symbol mark is present.

However, in a case in which the image data includes a spot color, there is a case in which a spot color in a deliverable is not realized, due to ink amount data (hereinafter, refer to as standard condition) created by the color converting section 44 as a default in accordance with a color conversion lookup table. Therefore, in the image processing device 110, ink amount data (hereinafter, refer to as specific condition) in which a spot color, which is evaluated in advance by a user, is realized is input (registered) to the color inputting section 42 of the resolution converting section 41, and in a case in which a spot color is included in the image data, the color converting section 44 creates the ink amount data based on a specific condition registered in advance which is not a standard condition. As a result, the printing device 120 forms the deliverable based on the specific condition, and thus it is possible to realize the spot color in the deliverable.

That is, in a case in which the spot color is included in the image data, and the spot color in the deliverable cannot be realized in the standard condition created by the color converting section 44 as a default, the user registers the specific condition for realizing the spot color in the color inputting section 42 in advance, and the color converting section 44 creates the ink amount data from the specific condition registered in advance. Also, the printing device 120 is capable of realizing the spot color in the deliverable by the print data based on the ink amount data created by the color converting section 44 from the specific condition.

Moreover, the spot color included in the image data is an example of a "first color". The ink amount data (the specific condition) realizing the spot color registered in the color inputting section 42 is an example of a "second color". Also, the color converting section 44 performs a spot color replacement of replacing the spot color (first color) included in the image data with the specific condition (second color).

In addition, the spot color which is an example of the "first color" is represented by a color specification value (coordinate value (RGB value) in RGB color space) corresponding to a color space (RGB color space) indicating the image data, and the specific condition (ink amount data), which is an example of the "second color", created by the color converting section 44 is represented by the color specification value (CMYK color system data) corresponding to the color space (CMYK color space) indicating the print data.

As illustrated in FIG. 3, on the registration screen, a region A where a list of registered spot colors is displayed, a region B where names of spot colors to be registered are input, a region C where numbers of the spot colors are input, a region D where RGB values of spot colors in the image data are input, a region E where ink amount data (specific condition) used for realizing spot colors in the printing device 120 are input, an icon F for reading a new registration screen, an icon G for deleting a registered condition, and an icon H for newly registering RGB values and specific conditions of spot colors are displayed on the user interface 52.

Also, the spot color (first color) input to the registration screen and the specific condition (second color) for realizing the spot color are linked to a specific number (spot color name) and are registered in the color inputting section 42. Moreover, contents (RGB value and specific condition of spot color) being registered by the color inputting section 42 are an example of a "preset in which a corresponding relationship between the first color and the second color is defined in advance". In the embodiment, the preset in which the corresponding relationship between the first color and the second color is defined in advance is made to be registered (set) in the color inputting section 42 through the registration screen of the user interface 52.

In other words, the resolution converting section 41 includes the color inputting section 42, which inputs the spot colors and the specific conditions, in order to perform the spot color replacement of replacing the spot color (first color) with the specific condition (second color) by the color converting section 44 through the user interface 52. Further, the spot color (first color) and the specific condition (second color) are set from the preset in which the corresponding relationship between the spot color and the specific condition is defined in advance through the user interface 52.

The RGB values of the image data is numerical values of 256 stages from zero to 255, and when the numerical value is 255, an amount of light of a color thereof becomes 100%. In addition, when each color of R, G, and B is designated to a value of zero to 255, the color can be expressed by combining the values. For example, an RGB value of red (R) is (255, 0, 0), an RGB value of green (G) is (0, 255, 0), an RGB value of blue (B) is (0, 0, 255), and an RGB value of white (W) is (255, 255, 255).

In description as follows, the RGB value of the spot color included in the image data is set to (100, 120, 80).

The ink amount data on which the color converting process is performed by the color converting section 44 is, for example, CMYK color system data of 256 gradations represented by the CMYK color space. In detail, the ink amount data is represented by numerical values which are divided into 256 stages from zero to 255 with respect to ink of each color of cyan (C), magenta (M), yellow (Y), black (K), orange (Or), green (Gr), and clear (CL). For example, ink amount data (255, 0, 0, 0, 0, 0, 0) means that the ink of cyan (C) is only discharged by a maximum discharge amount. Ink amount data (0, 255, 0, 0, 0, 0, 0) means that the ink of magenta (M) is only discharged by the maximum discharge amount. Ink amount data (0, 0, 255, 0, 0, 0, 0) means that the ink of yellow (Y) is only discharged by the maximum discharge amount. Ink amount data (0, 0, 0, 255, 0, 0, 0) means that the ink of black (K) is only discharged by the maximum discharge amount. Ink amount data (0, 0, 0, 0, 255, 0, 0) means that the ink of orange (Or) is only discharged by the maximum discharge amount. Ink amount data (0, 0, 0, 0, 0, 255, 0) means that the ink of green (Gr) is only discharged by the maximum discharge amount. Ink amount data (0, 0, 0, 0, 0, 0, 255) means that the ink of clear (CL) is only discharged by the maximum discharge amount.

In description as follows, the specific condition (ink amount data) in which the spot color in the printing device 120 can be realized is set to (0, 255, 0, 0, 0, 0, 10).

In a case in which the preset, in which the corresponding relationship between the first color and the second color is defined in advance, is set, the icon F is touched initially, and a new registration screen is called. On the new registration screen, a condition (spot color list) registered in the region A is displayed, and the region B to the region E are displayed in a non-input state. Also, a spot color name X1 is input to the region B, and a spot color No1 is input to the region C. With the spot color name X1 or the spot color No1, the registered preset is selectable.

Next, the RGB values of the spot colors in the image data are input to the region D. In the embodiment, the RGB value of the spot color in the image data is (100, 120, 80), and a R value=100, a G value=120, and a B value=80 are input to the region D.

Next, the specific condition at which the spot color can be realized is input to the region E. In the embodiment, the specific condition at which the spot color can be realized is (0, 255, 0, 0, 0, 0, 10), and the ink amount data of cyan (C) is zero, the ink amount data of magenta (M) is 255, the ink amount data of yellow (Y) is zero, the ink amount data of black (K) is zero, the ink amount data of orange (Or) is zero, the ink amount data of green (Gr) is zero, and the ink amount data of clear (CL) is 10 which are input to the region E.

Finally, the icon H is touched, and the RGB value (100, 120, 80) and the specific condition (0, 255, 0, 0, 0, 0, 0) of the spot color are registered in the color inputting section 42 of the resolution converting section 41 as the spot color No1 (spot color name X1).

The preset (RGB value and specific condition of spot color) being registered in the color inputting section 42 as the spot color No1 (spot color name X1) is obtained by creating a test pattern (color patch) and actually evaluating the color patch. Specifically, a condition with respect to a standard condition (standard ink amount data) corresponding to a spot color is changed, and a color patch is created on the medium 7. Next, when the color patch is evaluated by a colorimeter or visual observation, the specific condition (ink amount data) in which the spot color can be realized in the printing device 120 is obtained. Also, the specific condition at which the spot color can be realized is input to the region E, and the RGB value of the spot color corresponding to the specific condition is input to the region D.

In the embodiment, creation of the color patch, evaluation of the color patch, and registration of the RGB value and the specific condition of the spot color are performed by a user.

Moreover, the creation of the color patch, the evaluation of the color patch, and the registration of the RGB value and the specific condition of the spot color are not only performed by a user, but may also be performed in a manufacturing factory of the printing system 100. That is, in the manufacturing factory of the printing system 100, a configuration in which the RGB value and the specific condition of the spot color are obtained and registered in each airframe of the printing system 100 may be applied.

Outline of Thinning Process

Figure 4:
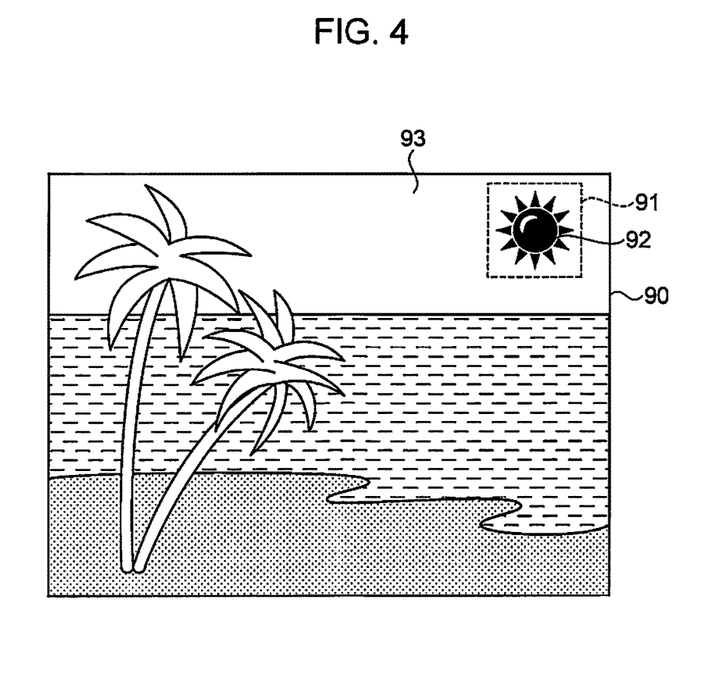
FIG. 4 is an example of image data including the spot color.
Figure 5:
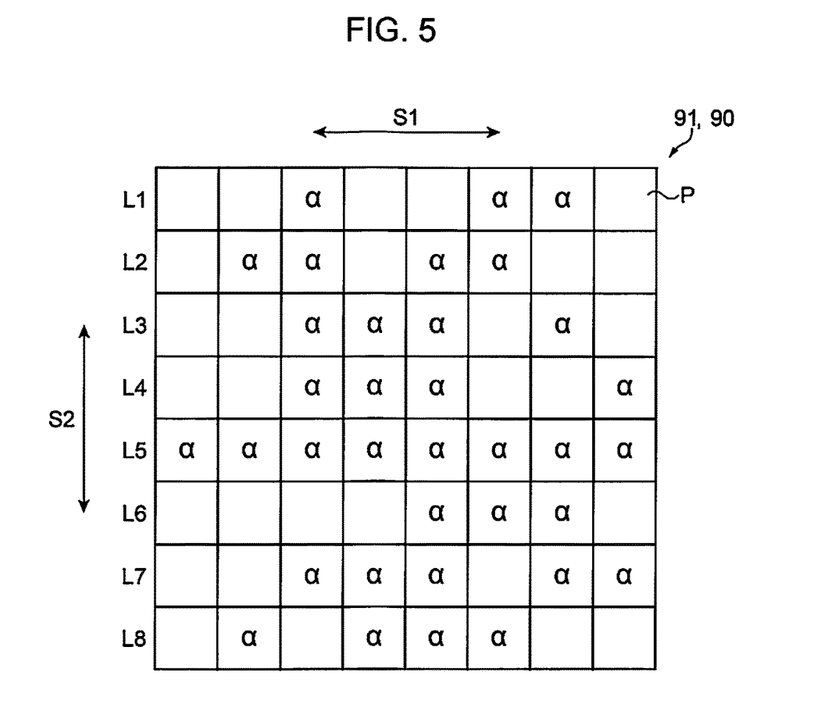
FIG. 5 is a perspective view illustrating a state of a spot color region before a thinning process.
Figure 6:
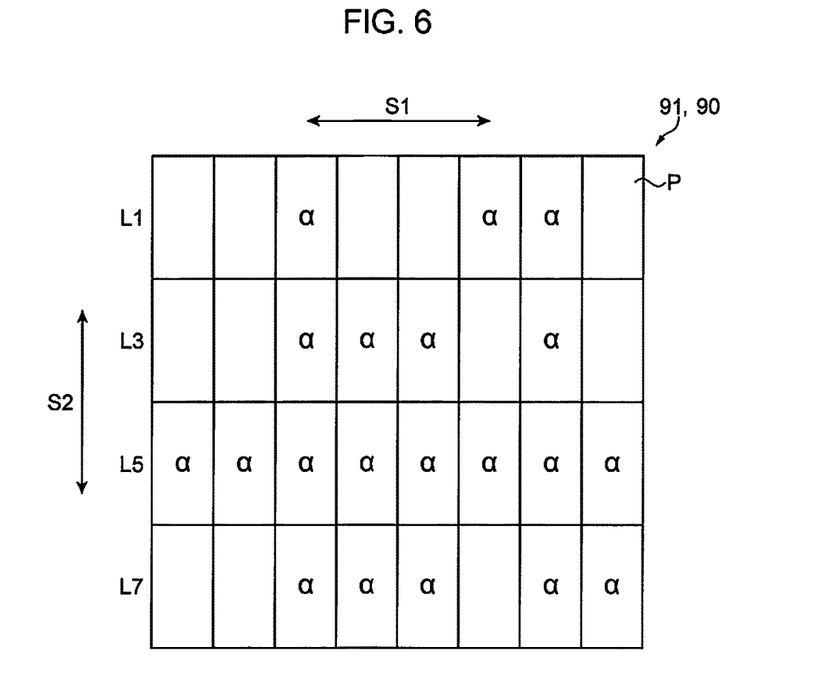
FIG. 6 is a perspective view illustrating a state of the spot color region after the thinning process.
Figure 7:
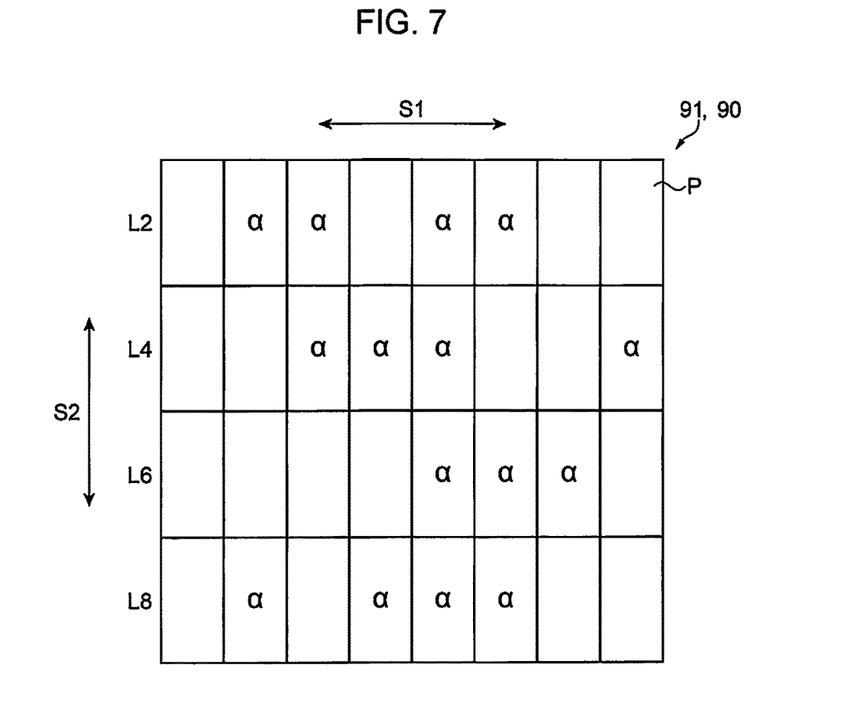
FIG. 7 is a perspective view illustrating the state of the spot color region after the thinning process.
Figure 8:
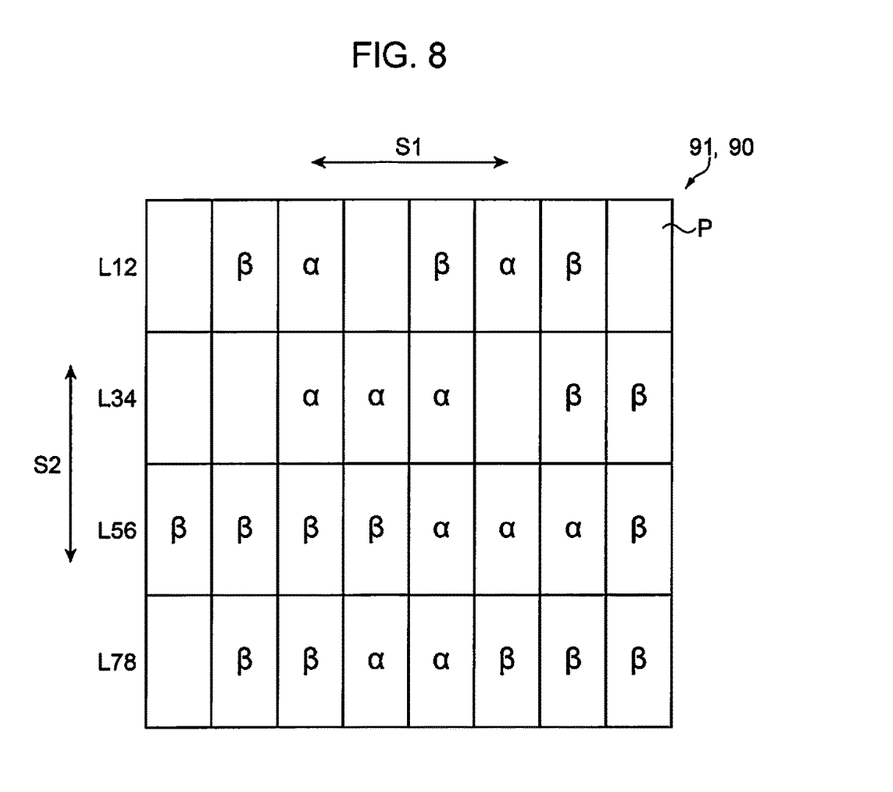
FIG. 8 is a perspective view illustrating the state of the spot color region after the thinning process.

FIG. 4 is an example of the image data including spot colors. FIG. 5 is a perspective view illustrating a state of a spot color region before a thinning process, FIGS. 6 to 8 are perspective views illustrating a state of the spot color region after the thinning process. Also, in FIG. 4, a region surrounded by a broken line is a spot color region 91 where spot colors are disposed.

Next, with reference to FIGS. 4 to 8, an outline of the thinning process, which is performed on the spot color region 91 where includes spot colors of the image data 90 by the thinning processing section 43 of the resolution converting section 41, will be described.

As described above FIG. 4, the image data 90 includes the spot color region 91 surrounded by a broken line in this drawing and a general region 93. The spot color region 91 is an example of a "predetermined region", and is a region (region including spot colors) where a symbol mark 92 in the image data 90 is disposed. The general region 93 is an example of a "region other than the predetermined region", and is a region other than the spot color region 91 in the image data 90.

The symbol mark 92 of a company is disposed on the spot color region 91, and a color of the symbol mark 92 is a corporate color and is a spot color that a user has attention. In addition, the RGB value of the spot color in the spot color region 91 and the specific condition at which the spot color can be realized are presets (RGB value and specific condition of spot color) registered in the color inputting section 42 as the spot color No1 (spot color name X1). That is, the RGB value of the spot color in the spot color region 91 is (100, 120, 80), and the specific condition at which the spot color can be realized is (0, 255, 0, 0, 0, 0, 0).

In description as follows, the RGB value of the spot color (100, 120, 80) is referred to as a color coordinate α. Further, the RGB value (178, 188, 168) obtained by averaging the RGB value of the spot color (100, 120, 80) and the RGB value of white (255, 255, 255) is referred to as a color coordinate β.

In FIGS. 5 to 8, a horizontal direction is a main scanning direction S1, and a vertical direction is a sub canning direction S2. Further, a region divided by a solid line in FIGS. 5 to 8 indicates a basic unit of colors of the spot color region 91 including spot colors in the image data 90. The image data 90 received from the image generating device 130 is RGB data constituted by color components of red (R), green (Gr), and blue (B), and a pixel unit constituted by a R pixel, a G pixel, and a B pixel is a basic unit of colors in the spot color region 91 including the spot colors of the image data 90.

Meanwhile, in the printing device 120, dots of cyan (C), dots of magenta (M), dots of yellow (Y), dots of black (K), dots of orange (Or), dots of green (Gr), and dots of clear (CL) becomes a basic unit, and a full color deliverable is formed. Therefore, a basic unit of colors in the image data 90 corresponding to the basic unit constituted by the dots of cyan (C), the dots of magenta (M), the dots of yellow (Y), the dots of black (K), the dots of orange (Or), the dots of green (Gr), and the dots of clear (CL) in the deliverable.

In description as follows, the basic unit of color in the spot color region 91 including the spot colors of the image data 90 is referred to as a color pixel P. That is, the region divided by a solid line in FIGS. 5 to 8 is the color pixel P (basic unit of color). Further, a region, which is divided by a solid line, having a symbol α is the color pixel P of the color coordinate α, a region, which is divided by a solid line, having a symbol β is the color pixel P of the color coordinate β, and a region, which is divided by a solid line, not having a symbol is the color pixel P of white.

Further, in FIGS. 5 to 8, in the spot color region 91 including the spot colors of the image data 90, a plurality of the color pixels P are disposed in a matrix shape along the main scanning direction S1 and the sub canning direction S2.

In order to easily understand description thereof, in the spot color region 91 (spot color region 91 illustrated in FIG. 5) including the spot colors of the image data 90 before the thinning process, the number of the color pixels P disposed along the main scanning direction S1 is eight, and the number of the color pixels P disposed along the sub canning direction S2 is eight. In addition, a mark Ln in FIG. 5 is a row of eight color pixels P disposed along the main scanning direction S1, and is referred to as, hereinafter, a color pixel row Ln.

The thinning process is a process of thinning a part of the image data 90 received from the image generating device 130 by the thinning processing section 43 of the resolution converting section 41 so that the resolution of the image data 90 becomes the same as the resolution of the printing resolution, in a case in which the resolution of the image data 90 received from the image generating device 130 is high, and the resolution (printing resolution) of the print data generated by the print data generating section 45 is low.

As described above, since the resolution of the image data 90 in the main scanning direction is 720 dpi, the resolution of the image data 90 in the sub canning direction is 720 dpi, the resolution of the print data in the main scanning direction is 720 dpi, and the resolution of the print data in the sub scanning direction is 360 dpi, the thinning processing section 43 of the resolution converting section 41 performs the thinning process of thinning data of the image data 90 the main scanning direction to be half.

The thinning processing section 43 of the resolution converting section 41 performs the thinning process of thinning the data from a state in which the eight color pixel rows Ln (data in main scanning direction) illustrated in FIG. 5 are disposed to a state in which the four color pixel rows Ln (data in main scanning direction) illustrated in FIGS. 6 to 8 are disposed in the spot color region 91 including the spot colors of the image data 90.

As illustrated in FIG. 5, the spot color region 91 before the thinning process is constituted by eight rows of color pixel rows L1, L2, L3, L4, L5, L6, L7, and L8 disposed along the sub canning direction S2. In the color pixel rows L1, L2, L3, L4, L6, L7, and L8 (color pixel row Ln of which color pixel row L5 is deleted), either of the color pixels P of the color coordinate α and the color pixels P of white is disposed along the main scanning direction S1, and the color pixels P of the color coordinate α are disposed in the color pixel row L5 along the main scanning direction S1.

Moreover, the color pixel row L5 in which the color pixels P of the color coordinate α are disposed along the main scanning direction S1 constitutes a ruled line pattern extending in the main scanning direction S1, and is an example of the "ruled line".

As illustrated in FIG. 6, the thinning processing section 43 performs thinning the data of the color pixel rows L2, L4, L6, and L8 from the data constituted by the color pixel rows L1, L2, L3, L4, L5, L6, L7, and L8 illustrated in FIG. 5 before the thinning process, and creates data constituted by the color pixel rows L1, L3, L5, and L7 after the thinning process.

As illustrated in FIG. 7, the thinning processing section 43 performs thinning on the data of the color pixel rows L1, L3, L5, and L7 from the data constituted by the color pixel rows L1, L2, L3, L4, L5, L6, L7, and L8 illustrated in FIG. 5 before the thinning process, and creates data constituted by the color pixel rows L2, L4, L6, and L8 after the thinning process.

The thinning process illustrated in FIGS. 6 and 7 is an example of a "simple thinning" which is a thinning process of thinning (cutting) data of one of the color pixel rows Ln to be data of the other of two color pixel rows Ln from the data constituted by the two color pixel rows Ln. Hereinafter, the thinning process illustrated in FIGS. 6 and 7 is referred to as a simple thinning process.

The spot color region 91 after the simple thinning process illustrated in FIGS. 6 and 7 is constituted by either of the color pixels P of the color coordinates α and the color pixels P of white in the same manner as that of the spot color region 91 before the thinning process illustrated in FIG. 5. That is, since the RGB values of the color coordinates α before the thinning process are reflected to the simple thinning process illustrated in FIGS. 6 and 7, the RGB values of the color coordinates α are not changed by the simple thinning process.

As seen from the above, since the color coordinates α of the color pixels P in the spot color region 91 on which the simple thinning process is performed by the thinning processing section 43 are not changed, the color converting section 44 performs the spot color replacement of replacing spot colors (color coordinates α of pixels P) included in the image data 90 in the specific condition, the print data generating section 45 generates print data based on the specific condition at which the spot color can be realized. Then, the printing device 120 creates a deliverable based on the print data in the specific condition at which the spot color can be realized, and it is possible to realize spot colors in the spot color region 91 of the deliverable.

If the color coordinates α of the color pixels P in the spot color region 91 on which the thinning process is performed by the resolution converting section 41 are changed, regarding the spot colors (changed color coordinate of color pixel P) included in the image data 90, the color converting section 44 sets ink amount data in a standard condition in which the spot color cannot be realized, not in the specific condition at which the spot color can be realized, and the spot colors in the spot color region 91 of the deliverable created by the printing device 120 cannot be realized.

Accordingly, in order to realize the spot colors in the spot color region 91 of the deliverable, the thinning process which is performed on the spot color region 91 including the spot colors of the image data 90 by the thinning processing section 43 of the resolution converting section 41 is preferably the simple thinning process.

In the embodiment, in a case in which the spot color region 91 including the spot colors of the image data 90 does not include a ruled line pattern, the simple thinning process is performed on the spot color region 91 including the spot colors of the image data 90. In other words, in a case in which the thinning process in which the resolution of the image data is converted from a first resolution (720×720 dpi) to a second resolution (720×360 dpi) lower than the first resolution (720×720 dpi) is performed, the thinning processing section 43 performs the simple thinning process on the spot color region (predetermined region) including the spot color (first color).

In the simple thinning process illustrated in FIG. 6, since the color pixel row L5 of the ruled line pattern is not thinned, in a deliverable created by the printing device 120 by the simple thinning process illustrated in FIG. 6, the ruled line pattern is formed, and the ruled line pattern is not lost. Meanwhile, in the simple thinning process illustrated in FIG. 7, since the color pixel row L5 of the ruled line pattern is thinned, in a deliverable created by the printing device 120 by the simple thinning process illustrated in FIG. 7, the ruled line pattern is formed, and the ruled line pattern is lost.

As seen from the above, in a case in which the ruled line (color pixel row L5) is lost in the image data 90 before the thinning process, the ruled line pattern (color pixel row L5) is thinned by the simple thinning process, and there is a concern that the ruled line is lost in the deliverable.

As illustrated in FIG. 8, the thinning processing section 43 newly creates a color pixel row L12 obtained by averaging the color pixel row L1 and the color pixel row L2, a color pixel row L34 obtained by averaging the color pixel row L3 and the color pixel row L4, a color pixel row L56 obtained by averaging the color pixel row L5 and the color pixel row L6, a color pixel row L78 obtained by averaging the color pixel row L7 and the color pixel row L8, from data before the thinning process which is constituted by the color pixel rows L1, L2, L3, L4, L5, L6, L7, and L8 illustrated in FIG. 5, and the thinning processing section creates data constituted by the color pixel rows L12, L34, L56, and L78.

The thinning process illustrated in FIG. 8 is an example of "average thinning" which is a process in which two color pixel rows (color pixel row Ln and color pixel row Ln+1) are averaged, and one color pixel row (color pixel row Ln or n+1) is newly created so that data is deleted. Hereinafter, the thinning process illustrated in FIG. 8 is referred to as an average thinning process.

Moreover, details will be described to be later, but in a case in which the ruled line pattern is included in the spot color region 91 including the spot colors of the image data 90, either of the simple thinning process and the average thinning process is performed on the spot color region 91 including the spot colors of the image data 90.

In a case in which the color pixels P of the color coordinates α are disposed in the color pixel row Ln, and the color pixels P of the color coordinate α are disposed in the color pixel row Ln+1, the RGB value of the color pixels P which are disposed in the color pixel row Ln or n+1 obtained by averaging the two color pixel rows (color pixel row Ln and color pixel row Ln+1) is the color coordinate α (100, 120, 80).

In a case in which the color pixels P of white are disposed in the color pixel row Ln, and the color pixels P of white are disposed in the color pixel row Ln+1, the RGB value of the color pixels P in the color pixel rows Ln or n+1 obtained by averaging the two color pixel rows (color pixel row Ln and color pixel row Ln+1) is the RGB value of white (255, 255, 255).

In a case in which the color pixels P (RGB value (100, 120, 80)) of the color coordinates α are disposed in the color pixel row Ln, and the color pixels P of white (RGB value (255, 255, 255) are disposed in the color pixel row Ln+1, the RGB value of the color pixels P in the color pixel rows Ln or n+1 obtained by averaging the two color pixel rows (color pixel row Ln and color pixel row Ln+1) is a color coordinate β (178, 188, 168).

As seen from the above, in the average thinning process in which one color pixel row (color pixel row Ln or n+1) is newly created by averaging the two color pixel rows (color pixel row Ln and color pixel row Ln+1), the color pixels P of color coordinates β different from the color pixels P of the color coordinates α may be formed.

In the color pixels P of the color coordinates α, since the color converting section 44 sets ink amount data in the specific condition in which the spot colors can be realized, and the print data generating section 45 generates print data based on the specific condition in which the spot colors can be realized, the spot colors in the spot color region 91 of the deliverable are realized.

Meanwhile, in the color pixels P of color coordinates β, the color converting section 44 sets the ink amount data in the standard condition in which spot colors cannot be realized, and the print data generating section 45 generates the print data based on the standard condition in which spot colors can be realized, and thus the spot colors in the spot color region 91 of the deliverable cannot be realized.

Accordingly, in the average thinning process illustrated in FIG. 8, a part where spot colors required by a user are realized, and a part where the spot color required by the user are not realized are mixed on the spot color region 91 of the deliverable, and thus it is difficult to strictly realize the spot colors of the deliverable. Therefore, in order to strictly realize the spot colors on the spot color region 91 of the deliverable created by the printing device 120, regarding the thinning process to be performed by the thinning processing section 43 of the resolution converting section 41 on the spot color region 91 including the spot colors of the image data 90, it is preferable that the simple thinning process be performed rather than the average thinning process.

Meanwhile, in the average thinning process illustrated in FIG. 8, in the color pixel row L56 obtained by averaging the color pixel row L5 and the color pixel row L6, either of the color pixels P of the color coordinates α and the color pixels P of color coordinates β are disposed along the main scanning direction S1, and thus a ruled line pattern extending in the main scanning direction S1 is formed.

That is, in the average thinning process in which one color pixel row (color pixel row Ln or n+1) is newly created by averaging the two color pixel rows (color pixel row Ln and color pixel row Ln+1), the ruled line pattern in the image data 90 before the average thinning process is reflected, and thus there is no concern that the ruled line pattern is lost in the deliverable, such that it is possible to strictly form the ruled line pattern in the deliverable.

As described above, in the simple thinning process, since the ruled line pattern (color pixel row L5) is thinned, and there is a concern that the ruled line in the deliverable is lost, the average thinning process is preferably performed in order to strictly form the ruled line pattern in the deliverable.

In the embodiment, the average thinning process is performed on the general region 93 of the image data 90. In other words, the thinning processing section 43 performs the average thinning process on the general region (region other than predetermined region).

Since the general region 93 of the deliverable does not include spot colors, there is no need to strictly realize the spot colors. Further, the general region 93 of the deliverable may include the ruled line pattern, and thus, as the thinning process with respect to the general region 93 of the image data 90, the thinning process capable of strictly forming the ruled line is preferable. That is, as the thinning process to be performed by the thinning processing section 43 on the general region 93 of the image data 90, the average thinning process is preferable.

Moreover, on the general region 93 of the image data 90, the color converting section 44 sets the ink amount data in the standard condition to be set as a default. In the standard condition set as a default, it is not possible to strictly realize the spot colors in the deliverable, but it is possible to realize high quality colors which can be supplied for practical use in the deliverable. Therefore, on the general region 93 of the image data 90, when the thinning processing section 43 performs the average thinning process, the color converting section 44 sets the ink amount data in the standard condition, and thus, in the printing device 120, the ruled line is strictly formed, and further, a high quality deliverable which can be supplied for practical used can be formed.

In the printing system 100, in a case in which the ruled line pattern (hereinafter, refer to as a spot color ruled line) of the color pixels P of the color coordinates α is included in the spot color region 91 in the image data 90 (image data 90 before thinning process) received from the image generating device 130, the user interface 52 displays that the ruled line of the spot colors are included in the spot color region 91 and informs including of the ruled line to a user. That is, the user interface 52 also functions as an informing section that informs including of the ruled line of the spot colors in the spot color region 91 to a user.

Moreover, other than a configuration in which including of the ruled line is displayed by the user interface 52 so as to be informed, a configuration in which including of the ruled line is informed using light of PATLITE (registered trademark), sound of buzzer, or the like may be used.

Further, the user interface 52 displays a selecting screen for selecting whether or not the simple thinning process or the average thinning process is performed on the spot color region 91 including the ruled line of the spot colors, after informing the ruled line of the spot colors included in the spot color region 91. The user selects the simple thinning process in a case in which the user considers that the spot colors are more important than the ruled line on the spot color region 91 of the deliverable, and the user selects the average thinning process in a case in which the user considers that the ruled line is more important than the spot colors on the spot color region 91 of the deliverable.

As seen from the above, in the printing system 100, in a case in which the ruled line of the spot colors is included in the spot color region 91 including the spot colors of the image data 90, either of the simple thinning process and the average thinning process is performed on the spot color region 91 including the spot colors of the image data 90, and in a case in which the ruled line of the spot colors is not included in the spot color region 91 including the spot colors of the image data 90, the simple thinning process is automatically performed on the spot color region 91 including the spot colors of the image data 90.

Further, in the printing system 100, the average thinning process is automatically performed on the general region 93 of the image data 90.

When the user selects a predetermined spot color No (spot color and specific condition) from the spot color list registered in the color inputting section 42, the printing system 100 automatically sets a part (spot color region 91) where the spot colors of the image data 90 are included, from the selected spot color No (spot color name), and the color converting section 44 performs the spot color replacement replacing the spot color in the specific condition on the spot color region 91 so that the spot colors in the spot color region 91 of the deliverable are realized.

That is, when the user selects a predetermined spot color No from the spot color list registered in the color inputting section 42, the spot color replacement of replacing the spot color in the specific condition is performed on the spot colors of the image data 90.

However, in a case in which general versatility of the spot color selected by the user is high, for example, in the image data 90 illustrated in FIG. 4, there is a case in which the spot colors may be included in a pattern other than the symbol mark 92 of the company. In this case, the spot colors are realized in not only the symbol mark 92 of the deliverable of the company, but also the spot colors are realized in a pattern other than the symbol mark 92 of the deliverable of the company. For example, when influence of the pattern other than the symbol mark 92 of the company on which the spot color replacement is performed becomes stronger, a defect in which the symbol mark 92 of the company is inconspicuous is generated.

Therefore, in the printing system 100, in addition to a mode in which a part (spot color region 91) where the spot colors of the image data 90 are included is automatically set by a device side, a mode in which the part (spot color region 91) where the spot colors of the image data 90 are included set by a user can be selected. That is, the image data 90 received from the image generating device 130 is displayed on the user interface 52, and the user can set the spot color region 91 from the image data 90 displayed on the user interface 52.

As seen from the above, the printing system 100 includes a configuration in which the user can set the spot color region 91 (predetermined region) through the user interface 52.

Moreover, the image processing device 110 and the printing device 120 may be not only configured separately, but also the printing device 120 may include the image processing device 110. That is, the printing device 120 further includes the host controller 40, the image data inputting section 51, the user interface 52, and the storage section 53, and may be configured to directly acquire the image data of the image generating device 130.

This application claims priority under 35 U.S.C. § 119 to Japanese Patent Application No. 2017-114950, filed Jun. 12, 2017. The entire disclosure of Japanese Patent Application No. 2017-114950 is hereby incorporated herein by reference.

What is claimed is:

1. An image processing device which generates print data for a printing device by performing an image process on image data, the device comprising:
 a user interface that is used for a user to set contents of the image process; and
 a processor including:
  an image data inputting section that inputs the image data;
  a resolution converting section that converts the image data to resolution corresponding to the printing device;
  a color converting section that generates ink amount data based on the image data converted by the resolution converting section; and
  a print data generating section that generates the print data based on the ink amount data,
 wherein the resolution converting section includes
 a color inputting section that inputs a first color and a second color through the user interface in order to perform a spot color replacement in which the first color is replaced with the second color by the color converting section, and
 a thinning processing section that determines whether or not the print data includes a predetermined region including the first color, the thinning processing section performing a simple thinning process on the predetermined region by eliminating one of two adjacent pixel rows constituting the image data upon determining that the image data includes the predetermined region and that the resolution of the image data is to be converted from a first resolution to a second resolution lower than the first resolution, and performing a different thinning process from the simple thinning process on a region other than the predetermined region upon determining that the image data does not include the predetermined region.

2. The image processing device according to claim 1, wherein the thinning processing section performs an average thinning process on a region other than the predetermined region.

3. The image processing device according to claim 1, wherein the predetermined region is set through the user interface.

4. The image processing device according to claim 1, wherein the first color and the second color are set based on a preset in which a corresponding relationship between the first color and the second color is defined in advance through the user interface.

5. The image processing device according to claim 1, wherein the first color is represented by a color specification value corresponding to a color space indicating the image data, and wherein the second color is represented by a color specification value corresponding to a color space indicating the print data.

6. The image processing device according to claim 1, wherein the processor further includes an informing section that informs a user in a case in which a ruled line is included in the predetermined region.

7. A printing system comprising:
the image processing device according to claim 1, and a printing device.

8. A printing system comprising:
the image processing device according to claim 2, and a printing device.

9. A printing system comprising:
the image processing device according to claim 3, and a printing device.

10. A printing system comprising:
the image processing device according to claim 4, and a printing device.

11. A printing system comprising:
the image processing device according to claim 5, and a printing device.

12. A printing system comprising:
the image processing device according to claim 6, and a printing device.

* * * * *